(12) United States Patent
Garhart

(10) Patent No.: US 11,020,879 B2
(45) Date of Patent: Jun. 1, 2021

(54) SELF PRESSURIZING BLADDER TOOLING

(71) Applicant: Sikorsky Aircraft Corporation, Stratford, CT (US)

(72) Inventor: Jonathan K. Garhart, Seymour, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 385 days.

(21) Appl. No.: 15/982,902

(22) Filed: May 17, 2018

(65) Prior Publication Data

US 2019/0351591 A1 Nov. 21, 2019

(51) Int. Cl.
| | |
|---|---|
| *B29C 70/34* | (2006.01) |
| *B29C 33/00* | (2006.01) |
| *B29C 43/36* | (2006.01) |
| *B29L 31/30* | (2006.01) |
| *B29C 33/50* | (2006.01) |

(52) U.S. Cl.
CPC ...... *B29C 33/0016* (2013.01); *B29C 43/3642* (2013.01); *B29C 70/342* (2013.01); *B29C 70/345* (2013.01); *B29C 33/505* (2013.01); *B29C 2043/3649* (2013.01); *B29L 2031/3076* (2013.01)

(58) Field of Classification Search
CPC . B29C 33/0016; B29C 33/505; B29C 70/342; B29C 70/345
See application file for complete search history.

(56) References Cited

U.S. PATENT DOCUMENTS

| | | | |
|---|---|---|---|
| 3,328,224 A | 6/1967 | Kennedy et al. | |
| 4,292,101 A * | 9/1981 | Reichert | B29D 24/004 |
| | | | 156/156 |
| 5,006,298 A * | 4/1991 | Tsai | B29C 43/32 |
| | | | 156/191 |
| 6,663,735 B2 | 12/2003 | Hashimura et al. | |
| 7,462,348 B2 | 12/2008 | Gruenbacher et al. | |
| 9,114,570 B2 * | 8/2015 | Downs | B32B 5/028 |
| 9,943,992 B2 * | 4/2018 | Nelson | B29C 35/0288 |
| 2016/0368174 A1 * | 12/2016 | Hoffman | B29C 33/44 |
| 2020/0207033 A1 * | 7/2020 | Wang | B29C 33/3821 |

FOREIGN PATENT DOCUMENTS

CN 102806668 A * 12/2012

* cited by examiner

*Primary Examiner* — Atul P. Khare
(74) *Attorney, Agent, or Firm* — Foley & Lardner LLP

(57) ABSTRACT

A method of fabricating a composite structure includes laying at least one composite ply about a bladder, the bladder comprising a phase change material in a first phase having a first volume, positioning an outer mold about the bladder and the at least one composite ply, and curing the at least one composite ply to form the composite structure. Curing causes the phase change material contained within the bladder to change to a second phase to expand from the first volume to a second volume and apply a pressure to an interior surface of the composite ply and press an outer surface of the composite ply against the outer mold to form an interior cavity. The bladder is not removable from the formed interior cavity.

13 Claims, 4 Drawing Sheets

SELF PRESSURIZING BLADDER TOOLING

BACKGROUND

Embodiments of the disclosure relate to the manufacture of high strength, light weight parts made of composite materials, and more particularly, to a system and a method for fabricating complex hollow composite structures.

Composites have proven to be very useful materials, especially in the field of aviation. Weight is a very important and sensitive subject and any method to limit or reduce it is valuable.

Complex composites structures often require specialized tooling to form trapped geometries. In the past, multi-piece hard tools, bladders, and washout mandrels have been used to provide internal support during the cure of the composite structure. With respect to multi-piece hard tools, provisions for removal of the tooling must be established, thereby limiting the types of parts that can be made. In addition, mandrels need access to wash out solid material after a curing process, and therefore complete removal can be an issue. Bladders typically require ports to provide a means for pressurizing and depressurizing the bladder during processing. Accordingly, none of the existing mechanisms provide a means of establishing an internal support for a fully enclosed volume of a composite structure.

BRIEF DESCRIPTION

According to an embodiment, a method of fabricating a composite structure includes laying at least one composite ply about a bladder, the bladder comprising a phase change material in a first phase having a first volume, positioning an outer mold about the bladder and the at least one composite ply, and curing the at least one composite ply to form the composite structure. Curing causes the phase change material contained within the bladder to change to a second phase to expand from the first volume to a second volume and apply a pressure to an interior surface of the composite ply and press an outer surface of the composite ply against the outer mold to form an interior cavity. The bladder is not removable from the formed interior cavity.

In addition to one or more of the features described above, or as an alternative, in further embodiments curing the at least one composite ply further comprises changing a temperature adjacent the at least one composite ply.

In addition to one or more of the features described above, or as an alternative, in further embodiments comprising at least partially filling an interior chamber of the bladder with the phase change material in the first state prior to laying the at least composite ply about the bladder.

In addition to one or more of the features described above, or as an alternative, in further embodiments in the first phase, the material is a liquid and in the second phase the material is a gas.

In addition to one or more of the features described above, or as an alternative, in further embodiments in the first phase, the material is a solid and in the second phase the material is a gas.

In addition to one or more of the features described above, or as an alternative, in further embodiments an exterior surface of the bladder defines a contour of an interior surface of the composite structure when in the inflated configuration.

In addition to one or more of the features described above, or as an alternative, in further embodiments an interior surface of the outer mold defines a contour of an exterior surface of the composite structure.

In addition to one or more of the features described above, or as an alternative, in further embodiments after curing the at least one composite ply is completed, the bladder including the material remains sealed within the at least one composite ply.

In addition to one or more of the features described above, or as an alternative, in further embodiments comprising removing the material from the bladder while the bladder remains within the composite structure.

In addition to one or more of the features described above, or as an alternative, in further embodiments comprising: removing the pressure applied by the material to the interior surface of the bladder after curing of the at least one composite ply is complete and removing the material from the composite structure.

According to yet another embodiment, a composite structure includes at least one composite ply defining a cavity, and a bladder arranged within the cavity such that the at least one composite ply is wrapped about the bladder. The bladder includes a flexible body operable to define an interior surface of the composite structure, the body having a hollow chamber and a phase change material arranged within the hollow chamber. The phase change material is in a first phase having a first volume when supplied to the hollow chamber and the phase change material is in a second phase having a second volume during a cure of the at least one composite ply wrapped about the bladder. The second volume is expanded relative to the first volume, and wherein the bladder is not removable from the cavity.

In addition to one or more of the features described above, or as an alternative, in further embodiments in the second phase, the phase change material is configured to apply a pressure to an interior surface of the bladder.

In addition to one or more of the features described above, or as an alternative, in further embodiments in the first phase the phase change material is a liquid and in the second phase the phase change material is a gas.

In addition to one or more of the features described above, or as an alternative, in further embodiments in the first phase the phase change material is a solid and in the second phase the phase change material is a gas.

In addition to one or more of the features described above, or as an alternative, in further embodiments the phase change material is one of water, ethanol, and carbon dioxide.

In addition to one or more of the features described above, or as an alternative, in further embodiments an exterior surface of the bladder defines a contour of an interior surface of the composite structure when the bladder is filled with the phase change material.

In addition to one or more of the features described above, or as an alternative, in further embodiments the flexible body further comprises an opening for providing the phase change material to the hollow chamber and a sealing device for sealing the phase change material within the hollow chamber.

In addition to one or more of the features described above, or as an alternative, in further embodiments the bladder including the phase change material remains sealed within the at least one composite ply.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Figure 1:
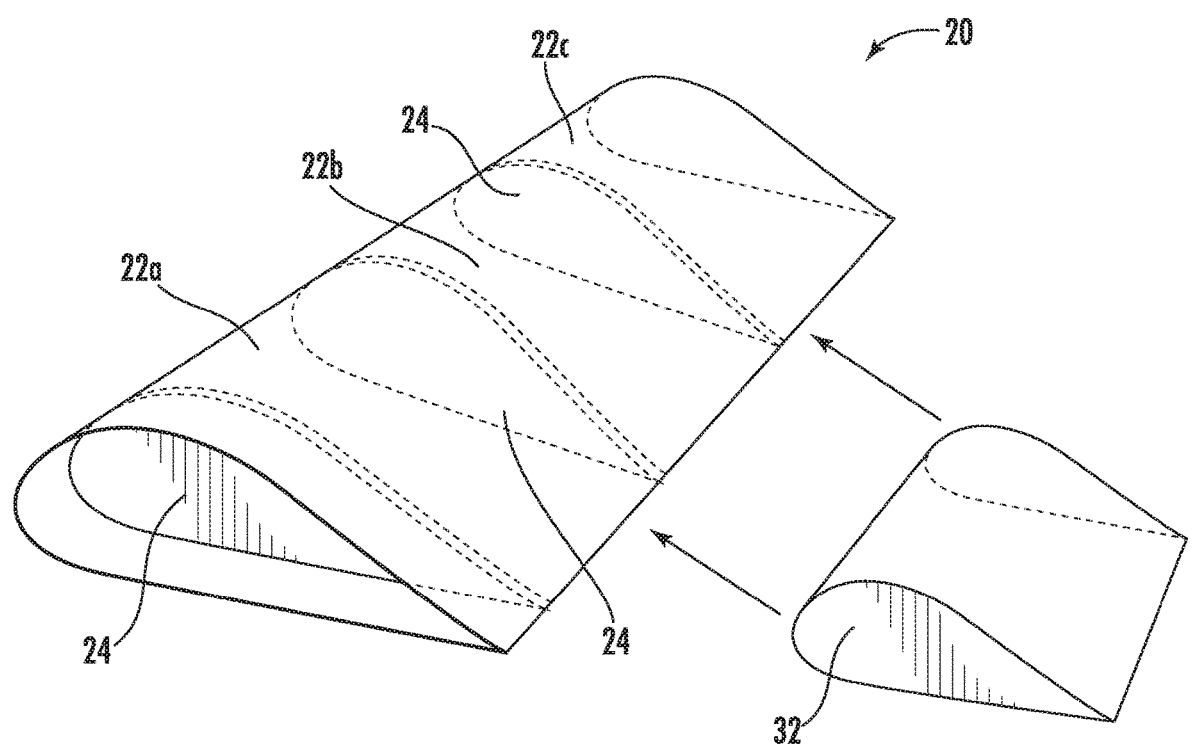
FIG. 1 is a perspective view of an example of a composite structure having an internal component.

Referring now to FIG. 1, an example of a composite structure formed having one or more hollow compartments is illustrated. As shown, the composite structure 20 is a wing of an aircraft. The wing 20 has an airfoil shape and includes at least one hollow compartment 22 defined within the interior of the structure 20. In the illustrated, non-limiting embodiment, the wing 20 includes three separate and distinct compartments 22a, 22b, 22c formed within the interior of the structure 20. Adjacent compartments may be separated from one another and sealed at the exposed ends of the composite structure 20 by a solid rib 24. It should be understood that the composite wing structure 20 illustrated and described herein is intended as an example only and that any suitable composite structure is considered within the scope of the disclosure. In embodiments where the composite structure 20 has a complex configuration and/or several internal compartments 22, it may be desirable to manufacture the composite structure 20 in segments or portions.

Figure 2:
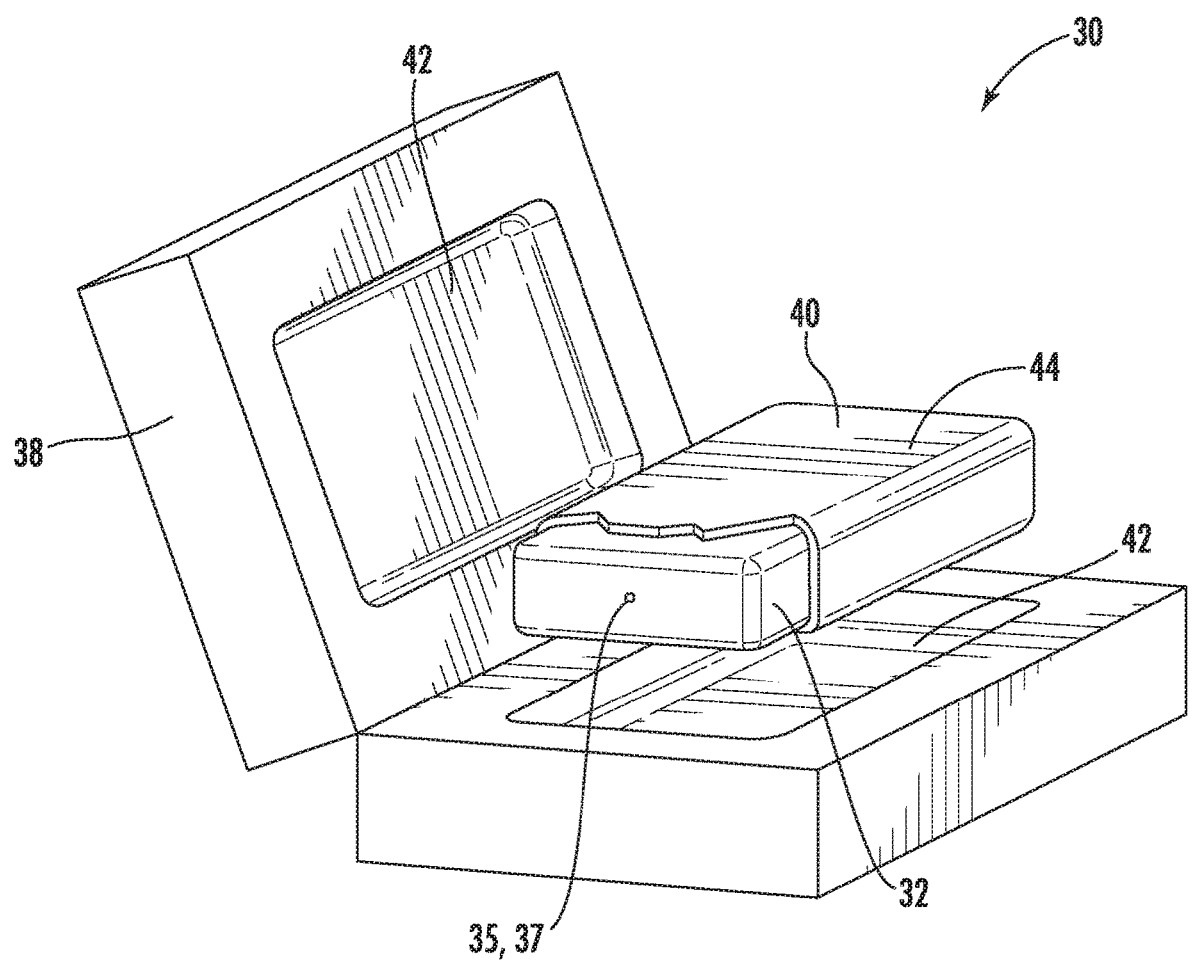
FIG. 2 is a perspective view of a system for forming a hollow composite structure according to an embodiment.
Figure 3:
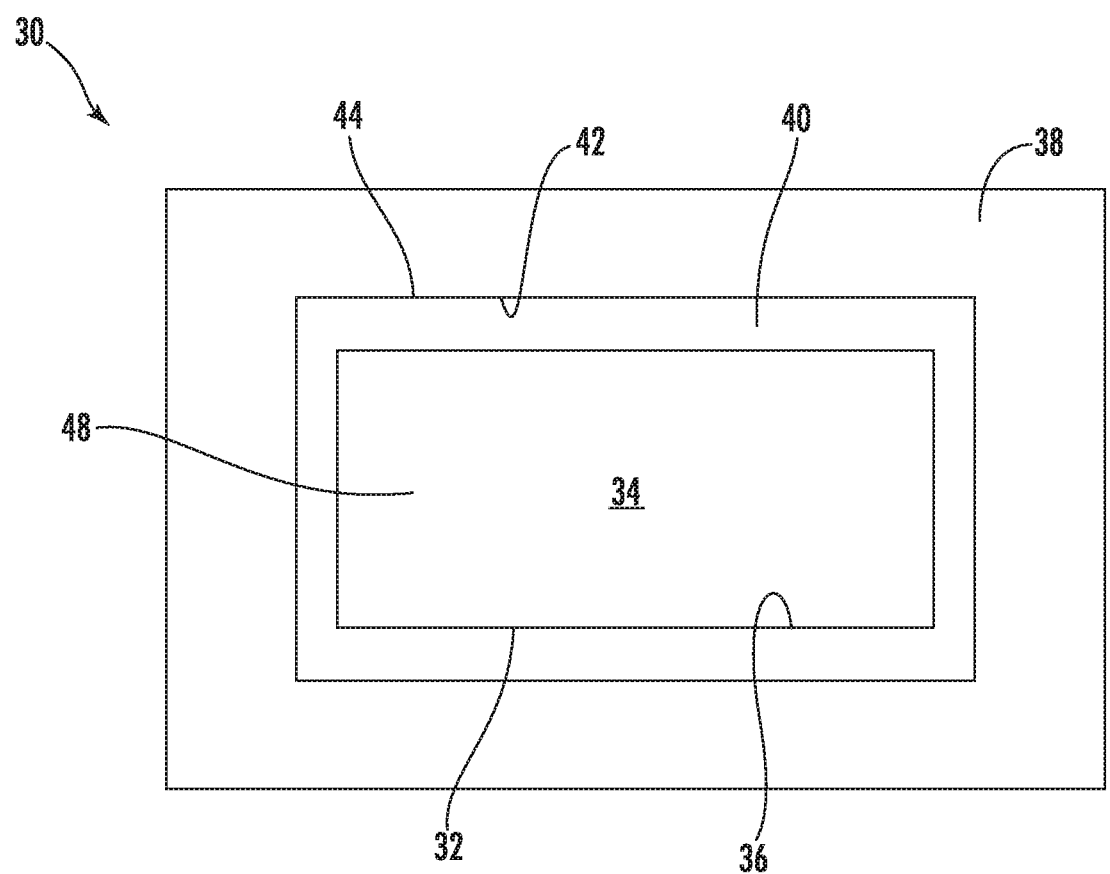
FIG. 3 is a cross-sectional view of the system of FIG. 2 for forming a hollow composite structure according to an embodiment.

With reference to FIGS. 2 and 3, an example of a system 30 for forming a hollow composite structure, such as a portion of the wing structure 20 of FIG. 1 for example, is illustrated in more detail. As shown, the system 20 includes a bladder 32 having a sealable internal chamber 34. The bladder 32 is formed from a flexible material and is transformable between an inflated configuration (shown) and a deflated configuration (not shown). In the inflated configuration, the shape or contour of the bladder 32 defines at least a portion of the shape of an inner surface 36 of the composite structure 20 being formed.

In an embodiment, the bladder 32 is transformed from a deflated configuration to an inflated configuration by filling the internal chamber 34 of the bladder 32. As shown, the bladder 32 may include an opening 35 which fluidly couples the interior 34 of the bladder 32 with an external ambient. A plug or other sealing device 37 is removably installable within the opening 35 to selectively seal the internal chamber 34 from ambient once a desired volume of material 48 has been provided to the bladder 32 to fill the chamber 34. As used herein the term "filled" may represent embodiments where the volume of the internal chamber 34, in its entirety, is occupied; however, in other embodiments, the term "filled" may be used to describe embodiments where only a portion of the internal volume of the chamber 34 is occupied. The bladder 32 may be transformed from the deflated configuration to an inflated configuration by filling the chamber 34 with a material 48 in a first phase or state. In an embodiment, the material 48 in a first state is a fluid, such as a liquid for example. However, in other embodiments, the material 48 in a first state used to fill the chamber 34 of the bladder 32 may be a gas, or alternatively, a solid. Examples of suitable materials 48 that may be used to inflate the bladder 32 include, but are not limited to water, ethanol, and carbon dioxide for example.

The material 48 used to fill the chamber 34 is selected to expand and apply a pressure to the internal surface of the bladder 32 while the composite structure 20 is cured. In an embodiment, the material 48 used to fill the chamber 34 will transform from a first phase or state to a second phase or state in response to the change in temperature present during the curing process. This change in phase will cause the material 48 to expand, thereby creating a volumetric pressure which is evenly distributed across the internal surface of the bladder 32. For example, a liquid selected to fill the chamber 34 will vaporize in response to an increase in temperature used to cure the plies of the composite structure 20. In embodiments where a solid is used to fill the chamber 34, the solid may transform to either a liquid or a gas, so long as the volume of the material 48 increases as a result of the change in state.

Further, the system 30 may additionally include an outer mold 38 formed from one or more pieces configured to cooperate to substantially surround the bladder 32 and the plurality of composite plies, shown at 40, wrapped about an exterior surface of the bladder 32. An inner surface 42 of the outer mold 36 is configured to define a desired shape of at least a portion of an outer surface 44 of the composite structure 20 being manufactured. Accordingly, the bladder 32 and the outer mold 38 cooperate to define the contours of the interior and exterior of the composite structure 20.

Figure 4:
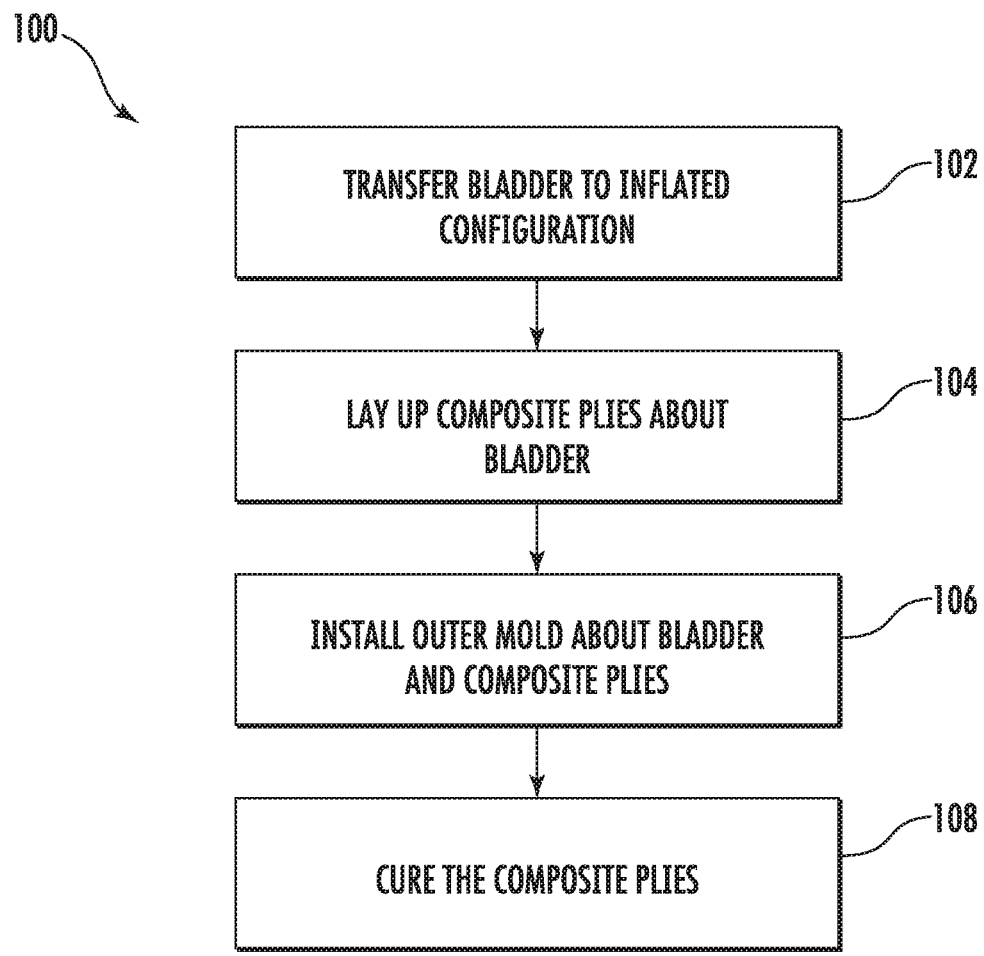
FIG. 4 is a block diagram illustrating a method of using the system of FIGS. 2 and 3 to form a hollow composite structure according to an embodiment.

A method 100 of manufacturing a hollow composite structure 20 using the system of FIGS. 2 and 3 is illustrated in FIG. 4. The method 100 includes placing a bladder 32 having the material 48 in the first state in the composite structure 20, the bladder 32 having a contour complementary to an interior surface of at least a portion of a composite structure 20 to be formed from a deflated configuration to an inflated configuration, as shown in block 102. As previously described, the phase change material may be any suitable material 48 configured to expand or increase in volume in response to an increase in temperature. The phase change material 48 used to fill the bladder 32 should be selected to achieve a suitable rate of expansion to apply a desired pressure to the interior of the bladder 32 when heated to a temperature range suitable to cure the composite plies of the composite structure 20. In block 104, once the bladder 32 has been filled with a phase change material 48 in a first phase, a plurality of composite plies are wound or laid up about the exterior surface of the bladder 32 in a desired manner. After laying all of the composite plies, in block 106, an outer mold 38 is then installed about the exterior of the bladder 32 and the composite plies.

In block 108, the bladder 32, composite plies, and outer mold 38 are then heated, such as via installation within an oven or autoclave for example, to cure the plurality of composite plies to form a solid composite structure 20. In response to the increased temperature surrounding the bladder 32 and outer mold 38, the phase change material 48 within the chamber 34 of the bladder 32 transforms to a second phase having an increased volume compared to the first phase. As a result of this increased volume, the material 48 in the second state applies a pressure to the interior surface of the bladder 32 during the cure process, i.e. while the temperature surrounding the bladder 32 and mold 38 is elevated. Once the cure process is completed, and the temperature surrounding the bladder 32 and outer mold 38 is reduced, the phase change material 48 will return to the first phase, thereby relieving the pressure acting on the interior surface of the composite structure 20. The composite structure 20 may then be removed from the outer mold 38. In addition, once the phase change material 48 has returned to the first phase, the phase change material 48 and the bladder 32 may remain inside the composite structure 20 in one embodiment. In another embodiment, the phase change material 48 may be removed from bladder 32 leaving the bladder 32 in the composite structure 20.

A bladder 32 filled with a phase change material as illustrated and described herein provides a cost effective component usable in the fabrication of complex hollow composite structures having an internal geometry. Further, the bladder is light enough that the bladder can remain within the cured composite structure 20 without a substantial weight penalty.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of fabricating a composite structure, the method comprising:
   laying at least one composite ply about a bladder, the bladder containing a phase change material in a first phase and having a first volume;
   positioning an outer mold about the bladder and the at least one composite ply; and
   curing the at least one composite ply to form the composite structure, wherein said curing causes the phase change material contained within the bladder to change from the first phase to a second phase and expand from the first volume to a second volume, thereby applying a pressure to an interior surface of the at least one composite ply and pressing an outer surface of the at least one composite ply against the outer mold so as to form an interior cavity within the composite structure, the bladder including a selectively sealable internal chamber enclosed within the interior cavity and having the material sealed therein during said curing, and wherein the bladder is not removable from the formed interior cavity.

2. The method of claim 1, wherein curing the at least one composite ply further comprises changing a temperature of the at least one composite ply.

3. The method of claim 1, further comprising at least partially filling the internal chamber of the bladder with the phase change material in the first state prior to laying the at least one composite ply about the bladder.

4. The method of claim 1, wherein in the first phase, the material is a liquid and in the second phase the material is a gas.

5. The method of claim 1, wherein in the first phase, the material is a solid and in the second phase the material is a gas.

6. The method of claim 1, wherein an exterior surface of the bladder defines a contour of an interior surface of the composite structure when in an inflated configuration provided by said expansion of the phase change material.

7. The method of claim 1, wherein an interior surface of the outer mold defines a contour of an exterior surface of the composite structure.

8. The method of claim 1, wherein after curing the at least one composite ply, the bladder including the material is sealed within the composite structure.

9. The method of claim 1, further comprising removing the material from the bladder while the bladder remains within the composite structure.

10. The method of claim 1, further comprising:
    removing the pressure applied by the material to the interior surface of the at least one composite ply after curing the at least one composite ply; and
    removing the material from the composite structure.

11. The method of claim 1, wherein the outer mold comprises a rectangular inner region having chamfered edges.

12. The method of claim 1, wherein the bladder comprises a sealing device removably installed within an opening of the bladder to provide said selective sealing of the internal chamber of the bladder.

13. The method of claim 1, wherein the composite structure is a hollow composite structure within which the bladder is enclosed and not removable.

* * * * *